(12) United States Patent
Tokuma et al.

(10) Patent No.: US 7,043,805 B2
(45) Date of Patent: May 16, 2006

(54) NC LATHE

(75) Inventors: Tsutomu Tokuma, Yamatokoriyama (JP); Masamitsu Nakaminami, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 107 days.

(21) Appl. No.: 10/885,044

(22) Filed: Jul. 7, 2004

(65) Prior Publication Data

US 2005/0022351 A1 Feb. 3, 2005

(30) Foreign Application Priority Data

Jul. 9, 2003 (JP) ............................. 2003-194603

(51) Int. Cl.
*B23P 23/02* (2006.01)

(52) U.S. Cl. .................... 29/27 C; 82/117; 82/121; 82/129; 82/137; 82/149; 409/202; 409/165

(58) Field of Classification Search ............. 29/27 C, 29/27 R; 82/129, 117, 120–121, 131–132, 82/137–138, 149, 157, 159; 409/165, 202, 409/212, 235

See application file for complete search history.

(56) References Cited

U.S. PATENT DOCUMENTS

| | | | | |
|---|---|---|---|---|
| RE31,288 E | * | 6/1983 | Matsuzaki et al. | ......... 29/27 C |
| 5,058,261 A | * | 10/1991 | Kitamura | ................ 29/27 C |
| 5,289,622 A | * | 3/1994 | Minagawa | .............. 29/27 R |
| 5,662,568 A | * | 9/1997 | Lindem | ................. 409/235 |
| 5,964,016 A | * | 10/1999 | Ito et al. | .................. 29/27 C |
| 6,224,462 B1 | * | 5/2001 | Yokoyama et al. | ......... 451/10 |
| 6,298,531 B1 | * | 10/2001 | Baumbusch et al. | ....... 82/129 |
| 6,519,823 B1 | * | 2/2003 | Sugata et al. | ............ 409/202 |
| 6,640,677 B1 | * | 11/2003 | Ueda et al. | .................. 82/129 |
| 6,796,012 B1 | * | 9/2004 | Geissler et al. | ........... 29/27 C |
| 2003/0041706 A1 | * | 3/2003 | Sugiura et al. | ............ 82/117 |

FOREIGN PATENT DOCUMENTS

| | | | |
|---|---|---|---|
| DE | 19919645 A1 | * | 11/2000 |
| EP | 528052 A1 | * | 2/1993 |
| JP | 5-8136 A | * | 1/1993 |
| JP | 10-34461 A | * | 2/1998 |
| JP | 2000-126953 A | * | 5/2000 |
| JP | 2002-59301 | | 2/2002 |
| JP | 2002-103139 A | * | 4/2002 |

* cited by examiner

*Primary Examiner*—Erica Cadugan
(74) *Attorney, Agent, or Firm*—Westerman, Hattori, Daniels & Adrian, LLP

(57) ABSTRACT

An NC lathe 1 comprises a bed 5, a headstock 10 provided on the bed 5, a main spindle 11 supported on the headstock 10 so as to be rotatable around the axis thereof, a rotation drive device for rotating the main spindle 11, a stationary frame 15 formed in a rectangular frame shape and fixed to the upper face of the bed 5, a movable frame 16 formed in a rectangular frame shape and provided so as to be movable in the Z-axis direction with respect to the stationary frame 15, a saddle 17 provided so as to be movable in the X-axis direction with respect to the movable frame 16, a quill 18 accommodated inside the accommodation hole 17a in the saddle 17 and provided so as to be movable in the Y-axis direction, and a tool rest 20 supported on the quill 18.

6 Claims, 5 Drawing Sheets

NC LATHE

BACKGROUND OF THE INVENTION

1. Field of the Invention

The present invention relates to an NC lathe comprising a headstock for rotatably supporting a main spindle for holding a workpiece, and a tool rest for holding a tool, the tool rest being movable in a predetermined feed direction.

2. Description of the Prior Art

Conventionally, a machine tool having a structure shown in FIGS. 7 and 8 is known as an NC lathe. This NC lathe 100 comprises a bed 101 formed in the shape of a triangular prism becoming broad toward the bottom, and a first headstock 102, a second headstock 105, a first tool rest 110, a second tool rest 115 and the like provided on the bed 101 as shown in FIGS. 7 and 8 (refer to Japanese Unexamined Patent Publication No. 2002-59301).

The first and second headstocks 102 and 105 rotatably support main spindles 103 and 106 around the axes thereof, respectively, and are provided with rotation drive devices (not shown) for rotating the main spindles 103 and 106 around the axes thereof. The first and second headstocks 102 and 105 are mounted on the inclined face on the front side of the bed 101. In addition, the second headstock 105 is configured so as to move in the arrow-indicated Z-axis direction under the guidance of first guide rails 108 provided on the inclined face on the front side of the bed 101 in parallel with the axis lines of the main spindles 103 and 106. Furthermore, the main spindles 103 and 106 are provided with chucks 104 and 107 for holding workpieces.

The first tool rest 110 is provided between the first headstock 102 and the second headstock 105 and comprises a saddle 111 configured so as to move in the arrow-indicated Z-axis direction under the guidance of the first guide rails 108, and a tool rest body 112, configured so as to move in the arrow-indicated X-axis direction under the guidance of guide rails (not shown) provided on the saddle 111 orthogonally to the axis lines of the main spindles 103 and 106, for holding tools T.

The second tool rest 115 comprises a column 116 configured so as to move in the arrow-indicated Z-axis direction under the guidance of second guide rails 109 provided on the inclined face on the rear side of the bed 101 in parallel with the axis lines of the main spindles 103 and 106, a support base 117 configured so as to move in the arrow-indicated X-axis direction under the guidance of guide rails (not shown) provided on the column 116 orthogonally to the axis lines of the main spindles 103 and 106, a tool rest body 118, rotatably supported by the support base 117 in the arrow-indicated B-axis direction around a predetermined rotation center axis and configured so that indexing is made possible at a predetermined rotation angle position in the B-axis direction, for rotatably holding a tool T, a drive motor 119, provided on the tool rest body 118, for rotating the tool T, and a storage box 120, installed on the support base 117 so as to protrude toward the front side of the tool rest body 118, for storing the electric wiring of the drive motor 119 and the like.

The second headstock 105, the saddle 111 and the tool rest body 112 of the first tool rest 110, and the column 116 and the support base 117 of the second tool rest 115 are configured so as to be moved in predetermined feed directions by feed devices (not shown) respectively corresponding thereto.

In this NC lathe 100, a workpiece held in the chuck 104 of the first headstock 102 or in the chuck 107 of the second headstock 105 is rotated when the main spindle 103 or 106 is rotated by the rotation drive device (not shown). Furthermore, the first tool rest 110 or the second tool rest 115 in which the tool T is held is moved in a predetermined feed direction by a feed device (not shown). Hence, a relative motion is carried out between the rotating workpiece and the tool T, whereby the workpiece is machined into a predetermined shape.

When the workpiece is machined, the tool T held in the second tool rest 115 is rotated appropriately by the drive motor 119, or the tool rest body 118 is rotated in the B-axis direction with respect to the support base 117 so as to be indexed appropriately at a predetermined rotation angle position in the B-axis direction in accordance with the machining requirements of the workpiece.

Structural members constituting an NC lathe are usually required to have sufficient rigidity so that highly accurate machining can be carried out, and these structural members have considerable weights. Because of the heavy weight of the column 116 serving as a movable body, the above-mentioned conventional NC lathe 100 has problems; that is, the load applied to a drive motor constituting a feed device (not shown) is large, the feed speed thereof cannot be raised, and the column 116 is apt to bend under the influence of inertia at the start and stop of the movement, thereby causing reduction in machining accuracy.

In addition, chips generated during workpiece machining fall down along the inclined face on the front side of the bed 101. Although the first guide rails 108 are appropriately enclosed with a cover (not shown), if chips enter the inside of the cover, the accuracy of the guidance for the second headstock 105 and the first tool rest 110 is lowered.

Furthermore, the bed 101 is formed so as to become broad toward the bottom, and the tool rest body 112 of the first tool rest 110 is movable by a predetermined amount in an obliquely downward direction away from the axis lines of the main spindles 103 and 106 along the X-axis. Hence, the size of the lower end of the bed 101 becomes large naturally, and the distances from the front end of the bed 101 to the main spindles 103 and 106 and the second tool rest 115 are large, thereby causing problems; that is, operator workability is low (it is difficult for the operator to come close to the workpiece machining area), and a wide installation area is required.

Still further, when the tool rest body 118 of the second tool rest 115 is rotated in the B-axis direction, the tool T held in the tool rest body 118 may be hidden behind the storage box 120 depending on the rotation angle position thereof, thereby causing inconvenience; that is, it is difficult for the operator to check the position and state of the tool T.

In view of the above-mentioned circumstances, an object of the present invention is to provide an NC lathe capable of carrying out highly accurate machining and being compact in size and high in operator workability.

SUMMARY OF THE INVENTION

In order to attain the above-mentioned object, an NC lathe in accordance with the present invention comprises:

a bed, a headstock provided on the bed, a main spindle supported by the headstock so as to be rotatable around the axis thereof and so that the axis line thereof is in the horizontal direction, a rotation drive device for rotating the main spindle around the axis thereof, a stationary frame formed in a rectangular frame shape and fixed to the upper face of the bed so that the horizontal sides thereof are parallel with the axis line of the main spindle and so that the vertical sides thereof are in the vertical direction, a movable frame formed in a rectangular frame shape so that the horizontal and vertical sides thereof are parallel with the horizontal and vertical sides of the stationary frame, respectively, and provided so as to be movable in a first-axis direction along the horizontal sides of the stationary frame, a first saddle provided so as to be movable in a second-axis direction along the vertical sides of the movable frame and having an accommodation hole passing through in a third-axis direction orthogonal to both the first axis and the second axis, a quill accommodated inside the accommodation hole in the first saddle and provided so as to be movable in the third-axis direction, a first tool rest supported on the front end face of the quill, a first guide device for guiding the movement of the movable frame along the first axis, a second guide device for guiding the movement of the first saddle along the second axis, a third guide device for guiding the movement of the quill along the third axis, a first feed device for moving the movable frame in the first-axis direction, a second feed device for moving the first saddle in the second-axis direction, a third feed device for moving the quill in the third-axis direction, and a control device for controlling the operations of the rotation drive device, the first feed device, the second feed device and the third feed device.

With the present invention, when the first feed device is driven by the control device, the movable frame is moved in a direction along the horizontal sizes of the stationary frame (in the first-axis direction (the horizontal direction)) under the guidance of the first guide device. When the second feed device is driven, the first saddle is moved in a direction along the vertical sides of the movable frame (in the second-axis direction (the vertical direction)) under the guidance of the second guide device. When the third feed device is driven, the quill is moved in the third-axis direction with respect to the first saddle under the guidance of the third guide device. As a result, the first tool rest supported on the front end face of the quill is moved in the orthogonal three-axis directions, that is, the first-axis, second-axis and third-axis directions.

Then, the main spindle of the headstock is rotated around the axis thereof by the rotation drive device. While a workpiece held in the main spindle is rotated, the first tool rest is moved in predetermined feed directions by the respective feed devices. Hence, a relative motion is carried out between the rotating workpiece and the tool held in the first tool rest, whereby the workpiece is machined into a predetermined shape.

As described above, the stationary frame and the movable frame are formed in a rectangular frame shape, whereby their weights are made light while constant rigidity is ensured.

Hence, with the NC lathe in accordance with the present invention, when the movable frame is moved, the loads applied to drive motors constituting the first feed device can be reduced, and the feed speed of the movable frame can be raised. Furthermore, at the start and stop of the movement of the movable frame, the influence of inertia is reduced, whereby the movable frame is prevented from being bent.

The first feed device may comprise a first driven member fixed to one of the horizontal side portions of the movable frame, a first drive member provided on one of the horizontal side portions of the stationary frame along the first axis and engaged with the first driven member to move the first driven member in the first-axis direction, a second driven member fixed to the other horizontal side portion of the movable frame, and a second drive member provided on the other horizontal side portion of the stationary frame along the first axis and engaged with the second driven member to move the second driven member in the first-axis direction.

With this configuration, the first and second driven members fixed to the horizontal side positions of the movable frame are moved by the first and second drive members, respectively, whereby the movable frame can be moved in the first-axis direction. Since both ends of the movable frame can be driven, wobbling or attitude unsteadiness during the movement of the movable frame can be prevented, and highly accurate machining can be carried out.

In addition, the bed may be formed so that the front face thereof is parallel with the vertical plane including the first axis, and the NC lathe may further comprise a second saddle provided on the front face of the bed so as to be movable in the first-axis direction, a second tool rest provided on the second saddle so as to be movable in the second-axis direction, a fourth guide device for guiding the movement of the second saddle along the first axis, a fifth guide device for guiding the movement of the second tool rest along the second axis, a fourth feed device for moving the second saddle in the first-axis direction, and a fifth feed device for moving the second tool rest in the second-axis direction. The control device may be further configured so as to control the operations of the fourth feed device and the fifth feed device. The first tool rest may be configured so as to be provided above the axis line of the main spindle and so as to approach the axis line of the main spindle from above and move away therefrom upward. The second tool rest may be configured so as to be provided below the axis line of the main spindle and so as to approach the axis line of the main spindle from below and move away therefrom downward.

With this configuration, chips generated during workpiece machining do not fall down or accumulate onto the bed but directly drop downward, unlike the configuration of the conventional lathe. Hence, trouble wherein chips enter the guide faces provided on the bed and the accuracy of the guidance is lowered can be prevented.

Still further, the front face of the bed is formed in a vertical face, the second tool rest is moved in the first-axis direction (the horizontal direction) and the second-axis direction (the vertical direction) along the front vertical face of the bed, the first tool rest is provided above the axis line of the main spindle, and the second tool rest is provided below the axis line. Hence, the main spindle, the first tool rest and the second tool rest are positioned further frontward (closer to the operator) from the front face of the bed, whereby the operator can easily carry out various operations for the main spindle, the first and second tool rests. Moreover, since the bed can be made smaller than the conventional bed that is formed so as to become broad toward the bottom, the entire size of the machine can be made compact.

Furthermore, the quill may have a slit hole passing through vertically, the shape of which in the longitudinal direction is formed in the third-axis direction. The first saddle may have through holes passing through vertically and aligned with the slit hole in the quill in the vertical direction. The second feed device may comprise a driven member fixed to the first saddle, and a drive member bridged between both horizontal side portions of the movable frame in a state of being inserted into the through holes in the first saddle and the slit hole in the quill along the second axis and configured so as to be engaged with the driven member to move the driven member in the second-axis direction.

With this configuration, a position closer to the central portion of the first saddle can be driven by the second feed device to move the first saddle. Hence, the first saddle can be moved smoothly without causing wobbling or attitude unsteadiness, whereby highly accurate machining can be attained.

Although the drive member of the second feed device is inserted into the slit hole in the quill, since the slit hole is formed so that the shape thereof in the longitudinal direction is formed in the third-axis direction, the drive member does not interfere with the quill even when the quill is moved in the third-axis direction.

Furthermore, the third guide device may comprise a sliding guide mechanism provided between the front inner circumferential faces of the accommodation hole in the first saddle and the front outer circumferential faces of the quill, and a rolling guide mechanism provided between the rear inner circumferential face of the accommodation hole in said first saddle and the rear outer circumferential face of the quill. The quill may be configured so that the movement thereof in the third-axis direction is guided by the sliding guide mechanism and the rolling guide mechanism.

A sliding guide mechanism and a rolling guide mechanism are usually available as guide devices, and the sliding guide mechanism is superior in rigidity and stability. However, the sliding face of the sliding guide mechanism wears out with the passage of time, and the guidance accuracy thereof is reduced. Hence, the sliding guide mechanism is required to be maintained periodically. In other words, the positions of gibs constituting the sliding guide mechanism and inserted between the faces of the sliding guide mechanism are required to be adjusted, or the shapes of the gibs are required to be corrected.

Hence, when such a sliding guide mechanism is used to guide the quill, the sliding guide mechanism must be maintained from the front side and the rear side of the quill. The maintenance from the front side of the quill can be carried out without difficulty even when the quill is accommodated in the accommodation hole in the first saddle. However, the maintenance from the rear side is difficult unless the quill is removed from the accommodation hole in the first saddle. Therefore, it takes a long time to attach/detach the quill to/from the first saddle, thereby causing a problem wherein maintenance cannot be carried out efficiently.

To solve this problem, a sliding guide mechanism requiring maintenance is provided on the front side of the quill, and a rolling guide mechanism requiring no maintenance is provided on the rear side of the quill as described above. With this configuration, the guide mechanisms can be maintained without removing the quill from the accommodation hole in the first saddle, whereby efficient maintenance can be carried out while guidance stability is ensured.

Furthermore, the first tool rest may be provided with a main spindle supported so as to be rotatable around the axis thereof, and a drive motor for rotating the main spindle around the axis thereof may be built in the first tool rest. The electric wiring of the drive motor may be connected to the drive motor via an inner space in the quill, an inner space formed in the installation portion of the quill and the first tool rest, and an inner space in the first tool rest sequentially.

With this configuration, the storage box installed in the conventional machine so as to protrude toward the front side of the tool rest is not necessary, and it is possible not to provide anything on the front side of the tool rest. Hence, the operator can always check the tool held in the first tool rest.

DESCRIPTION OF THE PREFERRED EMBODIMENTS

Figure 1:
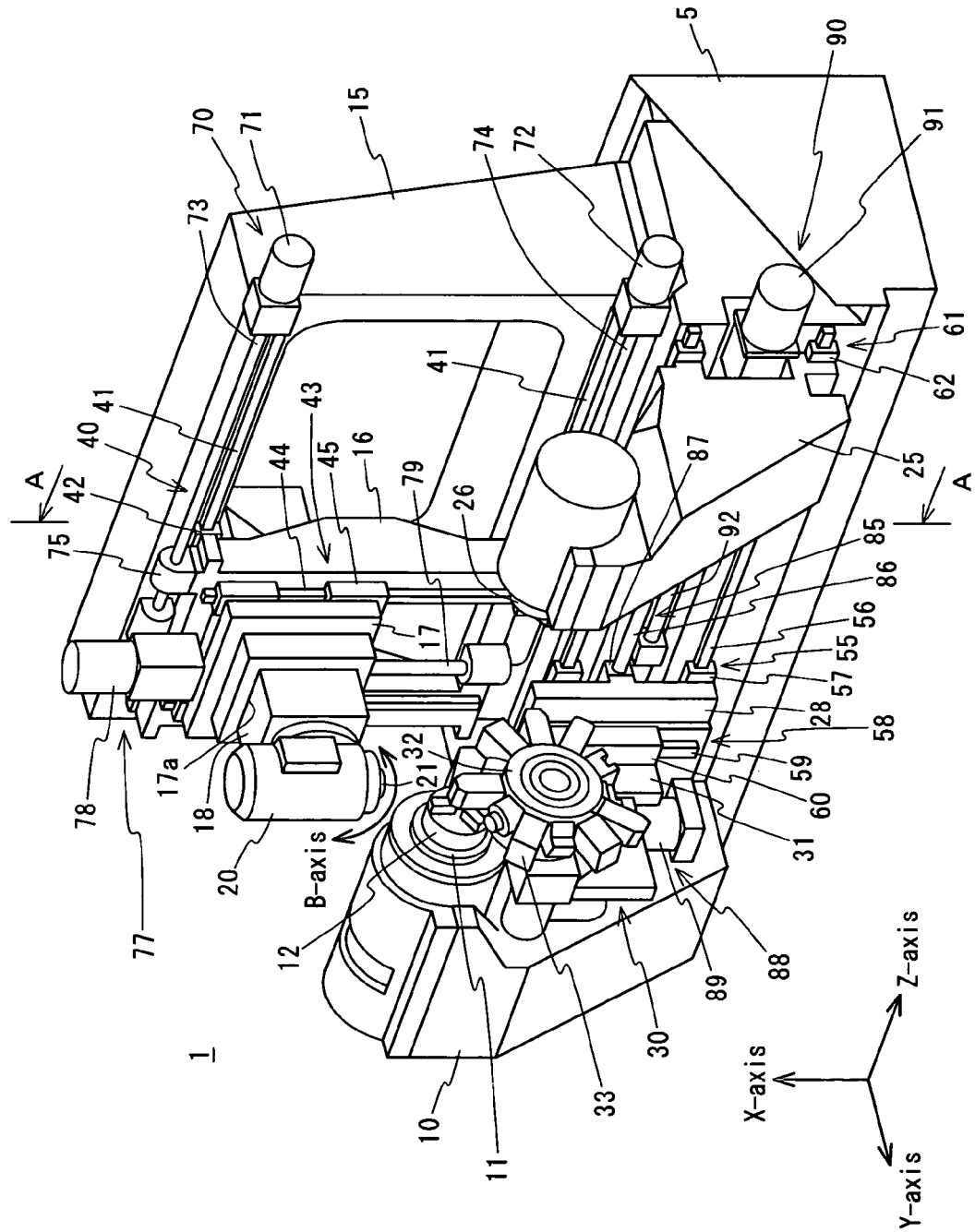
FIG. 1 is a perspective view showing a schematic configuration of an NC lathe in accordance with an embodiment of the present invention.
Figure 2:
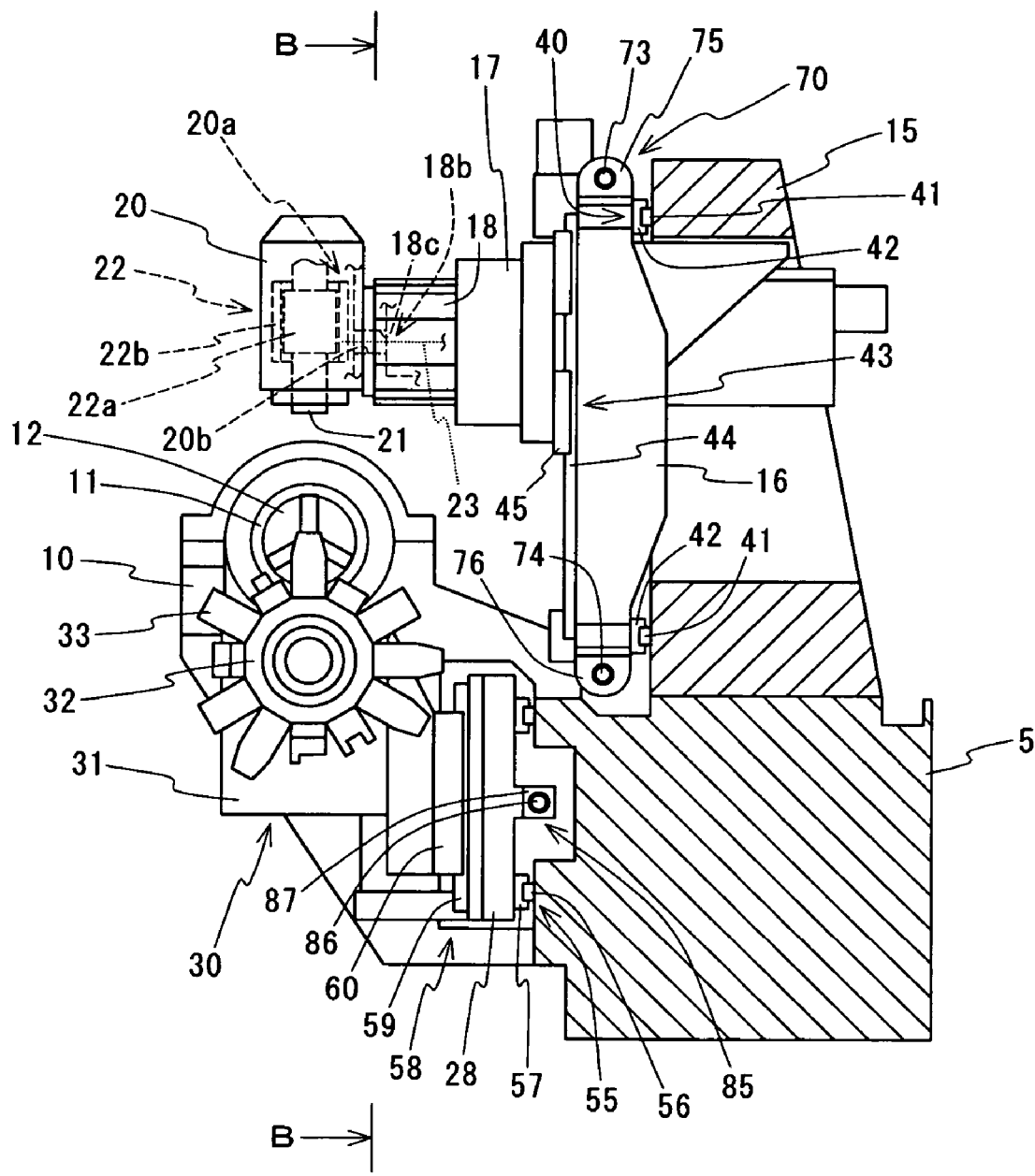
FIG. 2 is a cross-sectional view taken in the arrow-indicated A—A direction of FIG. 1.
Figure 3:
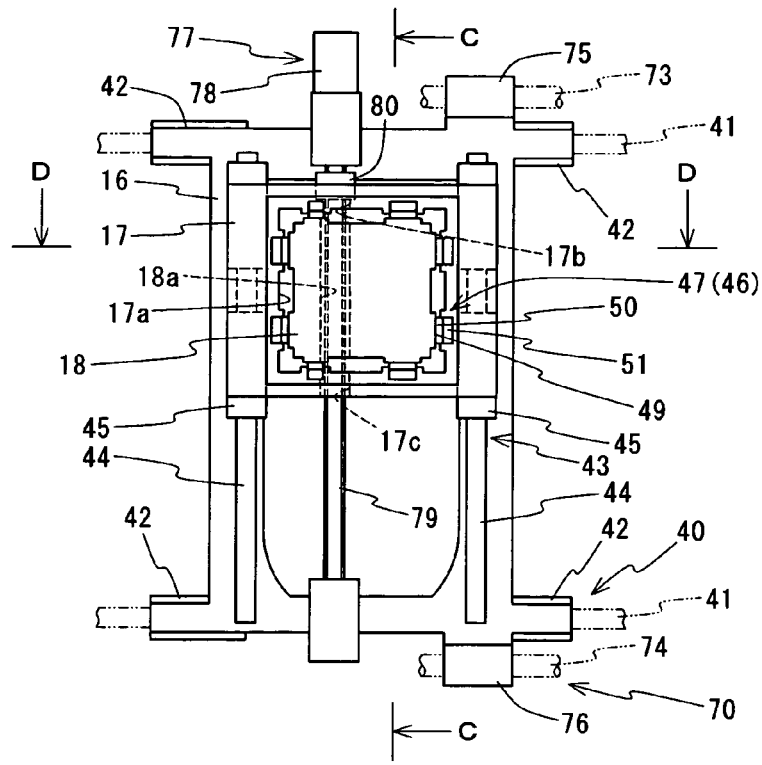
FIG. 3 is a front view taken in the arrow-indicated B—B direction of FIG. 2.
Figure 4:
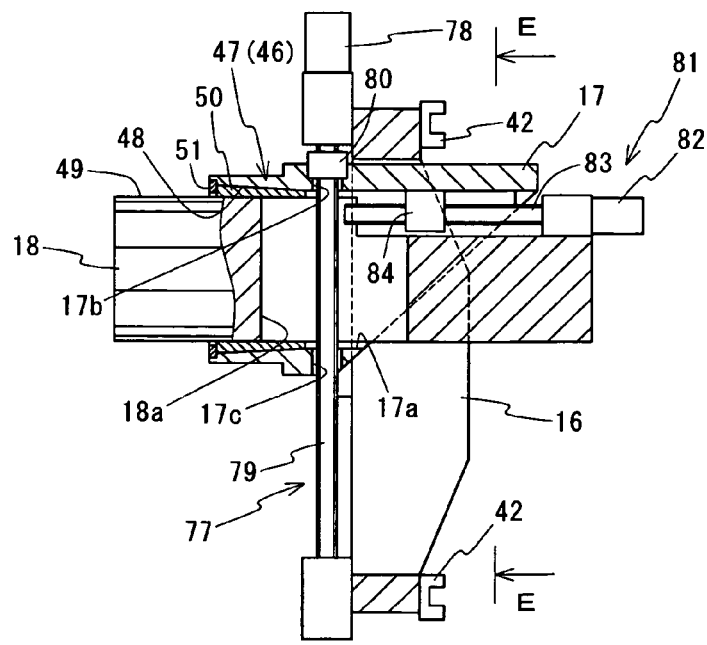
FIG. 4 is a cross-sectional view taken in the arrow-indicated C—C direction of FIG. 3
Figure 5:
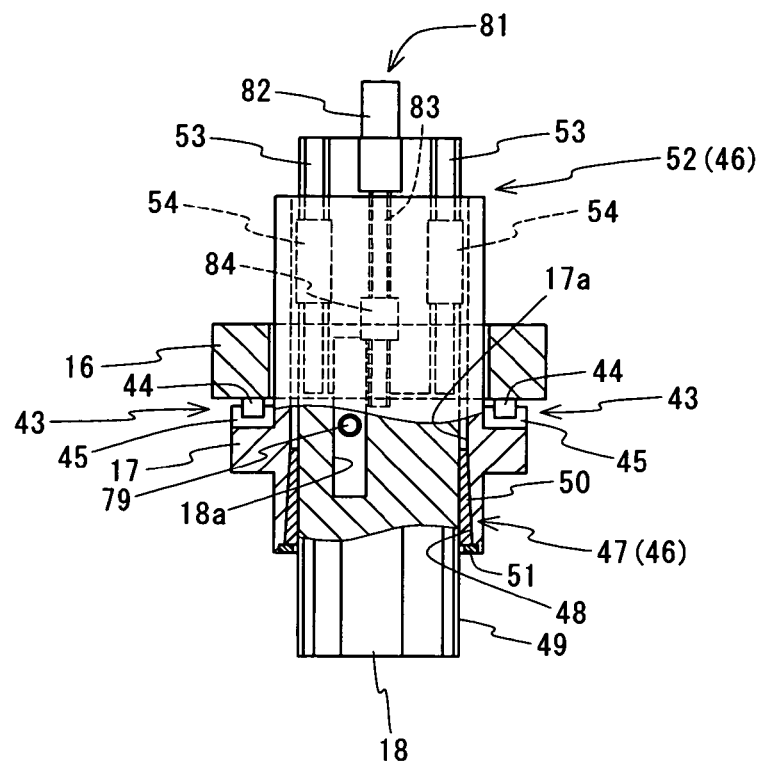
FIG. 5 is a cross-sectional view taken in the arrow-indicated D—D direction of FIG. 3.
Figure 6:
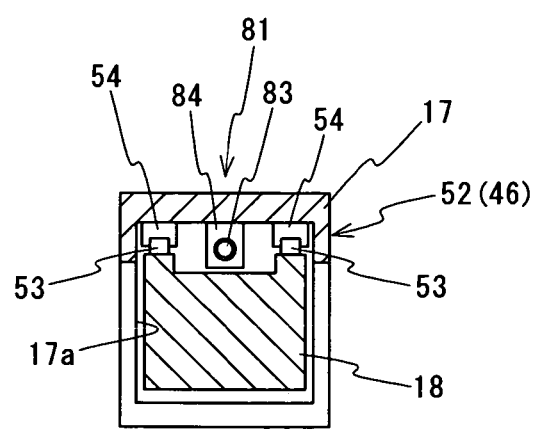
FIG. 6 is a cross-sectional view taken in the arrow-indicated E—E direction of FIG. 4.
Figure 7:
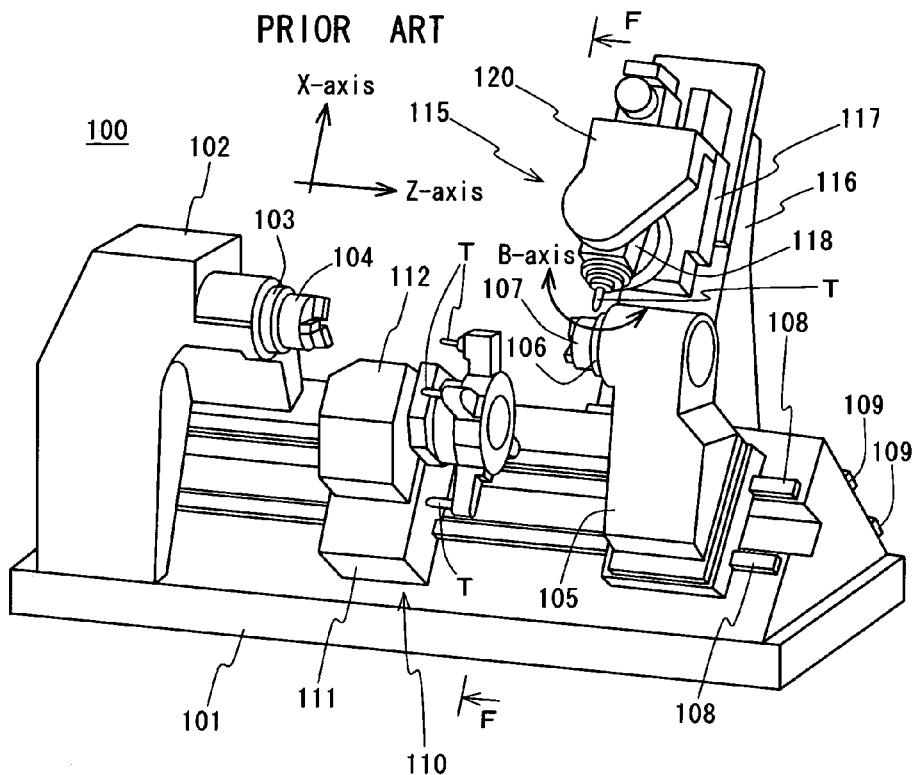
FIG. 7 is a perspective view showing a schematic configuration of the NC lathe in accordance with the conventional example.
Figure 8:
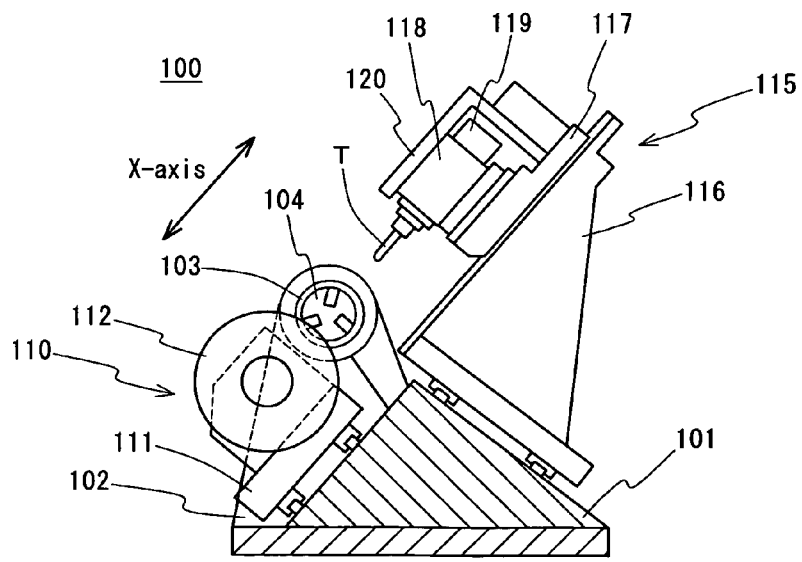
FIG. 8 is a cross-sectional view taken in the arrow-indicated F—F direction of FIG. 7.

A preferred embodiment of the present invention will be described below with reference to the accompanying drawings. FIG. 1 is a perspective view showing a schematic configuration of an NC lathe in accordance with an embodiment of the present invention. FIG. 2 is a cross-sectional view taken in the arrow-indicated A—A direction of FIG. 1. FIG. 3 is a front view taken in the arrow-indicated B—B direction of FIG. 2. FIG. 4 is a cross-sectional view taken in the arrow-indicated C—C direction of FIG. 3. FIG. 5 is a cross-sectional view taken in the arrow-indicated D—D direction of FIG. 3. FIG. 6 is a cross-sectional view taken in the arrow-indicated E—E direction of FIG. 4.

As shown in FIGS. 1 to 6, the NC lathe 1 in accordance with this embodiment comprises a bed 5 formed in a rectangular shape so that the upper face is horizontal and so that the front face is vertical, a first headstock 10 provided on the front face of the bed 5, a first main spindle 11 supported by the first headstock 10 so as to be rotatable around the axis thereof and so that the axis line thereof is parallel with the front face of the bed 5 in a horizontal plane, a stationary frame 15 formed in a rectangular frame shape and fixed to the upper face of the bed 5 so that the horizontal sides thereof are parallel with the axis line of the first main spindle 11 and so that the vertical sides thereof are in the vertical direction, a movable frame 16 formed similarly in a rectangular frame shape so that the horizontal and vertical sides thereof are parallel with the horizontal and vertical sides of the stationary frame 15, respectively, and provided so as to be movable in the Z-axis (first-axis) direction along the horizontal sides of the stationary frame 15, a first saddle 17 provided so as to be movable in the X-axis (second-axis) direction along the vertical sides of the movable frame 16 and having an accommodation hole 17a passing through in the Y-axis (third-axis) direction orthogonal to both the Z-axis and the X-axis, a quill 18 accommodated inside the accommodation hole 17a in the first saddle 17 and provided so as to be movable in the Y-axis direction, and a first tool rest 20 supported on the front end face of the quill 18.

The NC lathe 1 further comprises a second headstock 25 provided on the front face of the bed 5 so as to be opposed to the first headstock 10 and movable in the Z-axis direction, a second main spindle (not shown) supported by the second headstock 25 so as to be rotatable around the axis thereof and coaxial with the axis line of the first main spindle 11, a second saddle 28 provided on the front face of the bed 5 between the first headstock 10 and the second headstock 25 so as to be movable in the Z-axis direction, and a second tool rest 30 provided on the second saddle 28 so as to be movable in the X-axis direction.

Furthermore, the NC lathe 1 comprises a first guide device 40 for guiding the movement of the movable frame 16 along the Z-axis, a second guide device 43 for guiding the movement of the first saddle 17 along the X-axis, a third guide device 46 for guiding the movement of the quill 18 along the Y-axis, a fourth guide device 55 for guiding the movement of the second saddle 28 along the Z-axis, a fifth guide device 58 for guiding the movement of the second tool rest 30 along the X-axis, a sixth guide device 61 for guiding the movement of the second headstock 25 along the Z-axis, a first feed device 70 for moving the movable frame 16 in the Z-axis direction, a second feed device 77 for moving the first saddle 17 in the X-axis direction, a third feed device 81 for moving the quill 18 in the Y-axis direction, a fourth feed device 85 for moving the second saddle 28 in the Z-axis direction, a fifth feed device 88 for moving the second tool rest 30 in the X-axis direction, a sixth feed device 90 for moving the second headstock 25 in the Z-axis direction, and a control device (not shown) for controlling the operations of the first, second, third, fourth, fifth and sixth feed devices 70, 77, 81, 85, 88 and 90.

A rotation drive device (not shown), the operation of which is controlled by the control device (not shown), for rotating the first main spindle 11 around the axis thereof is built in the first headstock 10. A chuck 12 for holding a workpiece (not shown) is provided on the first main spindle 11.

Similarly, a rotation drive device (not shown), the operation of which is controlled by the control device (not shown), for rotating the second main spindle (not shown) around the axis thereof is built in the second headstock 25. A chuck 26 for holding a workpiece (not shown) is provided on the second main spindle (not shown).

Hence, when the rotation drive device of the first headstock 10 or the second headstock 25 is driven by the control device (not shown), the first main spindle 11 or the second main spindle (not shown) is rotated around the axis thereof, and the chuck 12 or 26 is rotated, whereby the workpiece (not shown) held in the chuck 12 or 26 is rotated.

The first saddle 17 has the rectangular accommodation hole 17a and is formed in a cylindrical shape extended in the Y-axis direction, wherein the bottom portion thereof is lost and the side portions thereof are gradually lost obliquely downward in the range from the vicinity of the central portion to the rear end portion in the Y-axis direction. The central portion in the Y-axis direction is supported by the movable frame 16.

In addition, the first saddle 17 has a first through hole 17b passing through from the upper face to the inner circumferential face of the accommodation hole 17a in the X-axis direction and a second through hole 17c passing through from the inner circumferential face of the accommodation hole 17a to the lower face in the X-axis direction. These through holes 17b and 17c are formed coaxially.

The quill 18 is formed in the shape of a rectangular prism extending in the Y-axis direction. The front side thereof in the Y-axis direction is opposed to all the inner circumferential faces of the accommodation hole 17a in the first saddle 17, and the rear side thereof is partly opposed to the rear upper and side portions of the first saddle 17.

Furthermore, the quill 18 has a slit hole 18a passing through from the upper face to the lower face in the X-axis direction, and the shape of the slit hole 18a in the longitudinal direction is formed in the Y-axis direction. This slit hole 18a is formed so as to be aligned with the through holes 17b and 17c in the first saddle 17 in the vertical direction.

Still further, the quill 18 rotatably supports the first tool rest 20 around the rotation center axis thereof (in the B-axis direction) that is parallel with the Y-axis. A first rotary indexing mechanism (not shown) for rotating the first tool rest 20 in the B-axis direction and indexing the first tool rest 20 at a predetermined rotation angle position under the control of the control device (not shown) is provided inside and on the front side of the quill 18.

The first tool rest 20 is provided with a tool spindle 21, which is supported so as to be rotatable around the axis thereof, for holding a tool (not shown). A drive motor 22 for rotating the tool spindle 21 around the axis thereof is built in the first tool rest 20. The first tool rest 20 is provided above the axis lines of the first main spindle 11 and the second main spindle (not shown) and configured so as to approach the axis lines from above and move away therefrom upward.

The drive motor 22 comprises a rotor 22a provided on the outer circumferential face of the tool spindle 21 and a stator 22b provided so as to enclose the rotor 22a with a predetermined clearance therebetween. Permanent magnets are used for the rotor 22a, and coils are used for the stator 22b.

Electric wiring 23 from the control device (not shown) is connected to the stator 22b via the inner space 18b in the quill 18, a through hole 18c passing through from the front end face to the inner space 18b in the quill 18, and a through hole 20b passing through from the inner space 20a in the first tool rest 20 to the face on which the quill 18 is installed, and communicated with the through hole 18c, sequentially.

Hence, when the drive motor 22 is driven by the control device (not shown), the tool spindle 21 is rotated around the axis thereof, whereby the tool held in the tool spindle 21 of the first tool rest 20 is rotated around the axis thereof. In other words, when current flows in the stator 22b, the rotor 22a is rotated with respect to the stator 22b, and the tool spindle 21 is rotated around the axis thereof, whereby the tool is rotated around the axis thereof.

The second tool rest 30 comprises a tool rest body 31, a turret 32 supported by the tool rest body 31 so as to be rotatable around the rotation center axis thereof that is parallel with the Z-axis, a tool holder 33, mounted on the turret 32, for holding tools (not shown), and a second rotary indexing mechanism (not shown) for rotating the turret 32 around the rotation center axis and indexing the tool holder 33 at a predetermined position under the control of the control device (not shown). The second tool rest 30 is provided below the axis lines of the first main spindle 11 and the second main spindle (not shown) and configured so as to approach the axis lines from below and move away therefrom downward.

The first guide device 40 comprises first guide rails 41 provided on the front faces of the horizontal side portions of the stationary frame 15 along the Z-axis, and first roller sliders 42 provided on the rear faces of the horizontal side portions of the movable frame 16 and engaged with the first guide rails 41 so as to be movable along these rails.

The first feed device 70 comprises first and second drive motors 71 and 72, provided on the stationary frame 15, the operations of which are controlled by the control device (not shown), a first ball screw 73 provided on one of the horizontal side portions of the stationary frame 15 along the Z-axis and rotated by the first drive motor 71 around the axis thereof, a second ball screw 74 provided on the other horizontal side portion of the stationary frame 15 along the Z-axis and rotated by the second drive motor 72 around the axis thereof, a first nut 75 fixed to one of the horizontal side portions of the movable frame 16 and threadedly engaged with the first ball screw 73, and a second nut 76 fixed to the other horizontal side portion of the movable frame 16 and threadedly engaged with the second ball screw 74.

Hence, when the ball screws 73 and 74, driven by the drive motors 71 and 72 of the first feed device 70 under the control of the control device (not shown), are rotated around the axes thereof, the nuts 75 and 76 threadedly engaged therewith are moved along the ball screws, respectively, whereby the movable frame 16 is moved in the Z-axis direction under the guidance of the first guide rails 41 and the first roller sliders 42.

The second guide device 43 comprises second guide rails 44 provided on the front faces of the vertical side portions of the movable frame 16 along the X-axis, and second roller sliders 45 provided on the rear faces of both end portions of the first saddle 17 in the Z-axis direction and engaged with the second guide rails 44 so as to be movable along these rails.

The second feed device 77 comprises a drive motor 78, provided on the movable frame 16, the operation of which is controlled by the control device (not shown), a ball screw 79 provided on the movable frame 16 along the X-axis so as to be bridged between both horizontal side portions of the movable frame 16 in a state of being inserted into the first and second through holes 17b and 17c in the first saddle 17 and the slit hole 18a in the quill 18 and configured so as to be rotated around the axis by the drive motor 78, and a nut 80 fixed to the first saddle 17 and threadedly engaged with the ball screw 79.

Hence, when the ball screw 79, driven by the drive motor 78 of the second feed device 77 under the control of the control device (not shown), is rotated around the axis thereof, the nut 80 threadedly engaged therewith is moved along the ball screw, whereby the first saddle 17 is moved in the X-axis direction under the guidance of the second guide rails 44 and the second roller sliders 45.

The third guide device 46 comprises a sliding guide mechanism 47 provided between the front inner circumferential faces of the accommodation hole 17a in the first saddle 17 and the front outer circumferential faces of the quill 18, and a rolling guide mechanism 52 provided between the rear upper inner circumferential face of the first saddle 17 and the rear outer circumferential face of the quill 18.

The sliding guide mechanism 47 comprises saddle-side sliding guide faces 48 formed along the Y-axis on the four front inner circumferential faces of the accommodation hole 17a in the first saddle 17, two on each face, so as to be inclined in the thickness direction from the front end to the rear side, quill-side sliding guide faces 49 formed on the four front outer circumferential faces of the quill 18, two on each face, so as to be engaged with the saddle-side sliding guide faces 48, eight gibs 50, tapered in accordance with the inclination of the saddle-side sliding guide faces 48 and inserted from the front end of the first saddle 17 between the saddle-side sliding guide faces 48 and the quill-side sliding guide faces 49, for adjusting the clearance between each of the guide faces 48 and each of the guide faces 49, and a fixture member 51 for fixing the gibs 50 to the first saddle 17.

The rolling guide mechanism 52 comprises third guide rails 53 provided along the Y-axis on the rear upper face of the quill 18, and third roller sliders 54, provided on the rear upper inner circumferential face, opposed to the quill 18, of the first saddle 17, and engaged with the third guide rails 53 so as to be movable along these rails.

The third feed device 81 comprises a drive motor 82, provided in the quill 18, the operation of which is controlled by the control device (not shown), a ball screw 83 provided in the quill 18 along the Y-axis and rotated by the drive motor 82 around the axis thereof, and a nut 84 fixed to the first saddle 17 and threadedly engaged with the ball screw 83.

Hence, when the ball screw 83, driven by the drive motor 82 of the third feed device 81 under the control of the control device (not shown), is rotated around the axis thereof, the nut 84 threadedly engaged therewith is moved along the ball screw, whereby the quill 18 is moved in the Y-axis direction under the guidance of the saddle-side sliding guide faces 48, the quill-side sliding guide faces 49, the third guide rails 53 and the third roller sliders 54.

Although the ball screw 79 of the second feed device 77 is inserted into the slit hole 18a in the quill 18, since the slit hole 18a is formed so that the shape thereof in the longitudinal direction is formed in the Y-axis direction, the ball screw 79 does not interfere with the quill 18 even when the quill 18 is moved in the Y-axis direction.

The fourth guide device 55 comprises fourth guide rails 56 provided on the front face of the bed 5 along the Z-axis, and fourth roller sliders 57 provided on the rear face of the second saddle 28 and engaged with the fourth guide rails 56 so as to be movable along these rails.

The fourth feed device 85 comprises a drive motor (not shown), provided on the bed 5, the operation of which is controlled by the control device (not shown), a ball screw 86 provided on the bed 5 along the Z-axis and rotated by a drive motor (not shown) around the axis thereof, and a nut 87 fixed to the second saddle 28 and threadedly engaged with the ball screw 86.

Hence, when the ball screw 86, driven by the drive motor (not shown) of the fourth feed device 85 under the control of the control device (not shown), is rotated around the axis thereof, the nut 87 threadedly engaged therewith is moved along the ball screw, whereby the second saddle 28 is moved in the Z-axis direction under the guidance of the fourth guide rails 56 and the fourth roller sliders 57.

The fifth guide device 58 comprises fifth guide rails 59 provided on the front face of the second saddle 28 along the X-axis, and fifth roller sliders 60 provided on the tool rest body 31 and engaged with the fifth guide rails 59 so as to be movable along these rails.

The fifth feed device 88 comprises a drive motor 89, provided on the second saddle 28, the operation of which is controlled by the control device (not shown), a ball screw (not shown) provided on the second saddle 28 along the X-axis and rotated by the drive motor 89 around the axis thereof via transmission gears (not shown) as necessary, and a nut (not shown) fixed to the tool rest body 31 and threadedly engaged with the ball screw (not shown).

Hence, when the ball screw (not shown), driven by the drive motor 89 of the fifth feed device 88 under the control of the control device (not shown), is rotated around the axis thereof, the nut (not shown) threadedly engaged therewith is moved along the ball screw, whereby the tool rest body 31 is moved in the X-axis direction under the guidance of the fifth guide rails 59 and the fifth roller sliders 60.

The sixth guide device 61 comprises the fourth guide rails 56, and sixth roller sliders 62 provided on the second headstock 25 and engaged with the fourth guide rails 56 so as to be movable along these rails.

The sixth feed device 90 comprises a drive motor 91, provided on the bed 5, the operation of which is controlled by the control device (not shown), a ball screw 92 provided on the bed 5 along the Z-axis and rotated by the drive motor 91 around the axis thereof, and a nut (not shown) fixed to the second headstock 25 and threadedly engaged with the ball screw 92.

Hence, when the ball screw 92, driven by the drive motor 91 of the sixth feed device 90 under the control of the control device (not shown), is rotated around the axis thereof, the nut (not shown) threadedly engaged therewith is moved along the ball screw, whereby the second headstock 25 is moved in the Z-axis direction under the guidance of the fourth guide rails 56 and the sixth roller sliders 62.

In the NC lathe 1 in accordance with this embodiment configured as described above, when the first feed device 70 is driven by the control device (not shown), the movable frame 16 is moved in the Z-axis direction with respect to the stationary frame 15 under the guidance of the first guide device 40. When the second feed device 77 is driven, the first saddle 17 is moved in the X-axis direction with respect to the movable frame 16 under the guidance of the second guide device 43. When the third feed device 81 is driven, the quill 18 is moved in the Y-axis direction with respect to the first saddle 17 under the guidance of the third guide device 46. As a result, the first tool rest 20 supported on the front end face of the quill 18 is moved in the orthogonal three-axis directions, that is, the X-axis, Y-axis and Z-axis directions.

In addition, when the fourth feed device 85 is driven by the control device (not shown), the second saddle 28 is moved in the Z-axis direction with respect to the bed 5 under the guidance of the fourth guide device 55. When the fifth feed device 88 is driven, the second tool rest 30 is moved in the X-axis direction with respect to the second saddle 28 under the guidance of the fifth guide device 58. As a result, the second tool rest 30 is moved in the orthogonal two-axis directions, that is, the X-axis and Z-axis directions.

Furthermore, when the sixth feed device 90 is driven by the control device (not shown), the second headstock 25 is moved in the Z-axis direction with respect to the bed 5 under the guidance of the sixth guide device 61.

Then, the first main spindle 11 of the first headstock 10 or the second main spindle (not shown) of the second headstock 25 positioned at a predetermined position in the Z-axis direction is rotated around the axis thereof by a rotation drive device (not shown). In a state wherein the workpiece held in the chuck 12 or 26 of the first main spindle 11 or the second main spindle (not shown) is rotated, while the tool indexed at a predetermined rotation angle position in the B-axis direction by the first rotary indexing mechanism (not shown) is rotated by the drive motor 22, the first tool rest 20 is moved in predetermined feed directions by the feed devices 70, 77 and 81, or the second tool rest 30 having the tool holder 33 that holds a predetermined tool and is indexed at a predetermined position by the second rotary indexing mechanism (not shown) is moved in predetermined feed directions by the feed devices 85 and 88. Hence, a relative motion is carried out between the rotating workpiece and the tool held in the first tool rest 20 or the second tool rest 30, whereby the workpiece is machined into a predetermined shape.

The sliding guide mechanism 47 of the third guide device 46 is maintained periodically as necessary. In other words, the shapes of the quill-side sliding guide faces 49 are corrected and the insertion positions of the gibs 50 in the Y-axis direction are adjusted so that the clearances between the saddle-side sliding guide faces 48 and the quill-side sliding guide faces 49 are adjusted.

As described above, the stationary frame 15 and the movable frame 16 are formed in a rectangular frame shape, whereby their weights are made light while necessary rigidity is ensured.

Hence, with the NC lathe 1 in accordance with this embodiment, when the movable frame 16 is moved, the loads applied to the drive motors 71 and 72 of the first feed device 70 can be reduced, and the feed speed of the movable frame 16 can be raised. Furthermore, at the start and stop of the movement of the movable frame 16, the influence of inertia is reduced, whereby the movable frame 16 is prevented from being bent.

In addition, the nuts 75 and 76 fixed to the horizontal side positions of the movable frame 16 are moved by the ball screws 73 and 74, respectively, whereby the movable frame 16 is moved in the Z-axis direction. Both ends of the movable frame 16 can thus be driven. Hence, wobbling or attitude unsteadiness during the movement of the movable frame 16 can be prevented, and highly accurate machining can be carried out.

Furthermore, the front face of the bed 5 is formed in a vertical face, whereby chips generated during workpiece machining do not fall down onto the bed 5 but directly drop downward, unlike the configuration of the conventional lathe. Hence, trouble wherein chips become attached to the fourth guide rails 56 provided on the bed 5 and the accuracy of the guidance is lowered can be prevented.

Still further, the front face of the bed 5 is formed in a vertical face, the second tool rest 30 is moved in the Z-axis and X-axis directions along the front vertical face of the bed 5, the first tool rest 20 is provided above the axis lines of the first main spindle 11 and the second main spindle (not shown), and the second tool rest 30 is provided below the axis lines. Hence, the first main spindle 11 and the second main spindle (not shown), the first tool rest 20 and the second tool rest 30 are positioned further frontward (closer to the operator) from the front face of the bed 5, whereby the operator can easily carry out various operations for the first main spindle 11, the second main spindle (not shown), the first tool rest 20 and the second tool rest 30. Moreover, since the bed 5 can be made smaller than the conventional bed that is formed so as to become broad toward the bottom, the entire size of the machine can be made compact.

Still further, the ball screw 79 of the second feed device 77 is provided in a state of being inserted into the through holes 17b and 17c in the first saddle 17 and the slit hole 18a in the quill 18, and a position closer to the central portion between the second roller sliders 45 provided on both ends of the first saddle 17 is driven by the second feed device 77 to move the first saddle 17, that is, a position close to the center of gravity of the first saddle 17 is driven. Hence, the first saddle 17 can be moved smoothly without causing wobbling or attitude unsteadiness, whereby highly accurate machining can be attained.

Still further, the sliding guide mechanism 47 having high guidance stability, although requiring maintenance, is used to guide the front side of the quill 18, and the rolling guide mechanism 52 requiring no maintenance, although having slightly low guidance stability, is used to guide the rear side of the quill 18. Hence, the sliding guide mechanism 47 can be maintained without removing the quill 18 from the accommodation hole 17a in the first saddle 17, whereby efficient maintenance can be attained while guidance stability is ensured.

Still further, the electric wiring 23 of the drive motor 22 on the first tool rest 20 is connected via the inner space 18b in the quill 18, the through hole 18c passing through from the front end face to the inner space 18b in the quill 18, and the through hole 20b passing through from the inner space 20a in the first tool rest 20 to the face on which the quill 18 is installed, and communicated with the through hole 18c, sequentially. Hence, the storage box installed in the conventional machine so as to protrude toward the front side of the tool rest is not necessary, and it is possible not to provide anything on the front side of the tool rest. Hence, the operator can always check the tool held in the first tool rest 20 at all the rotation angle positions in the B-axis direction.

An embodiment in accordance with the present invention has been explained above. However, specific embodiments capable of being attained by the present invention are not limited to this.

What is claimed is:

1. An NC lathe comprising:
a bed,
a headstock provided on said bed,
a main spindle supported by said headstock so as to be rotatable around the axis thereof and so that the axis line thereof is in the horizontal direction,
a rotation drive device for rotating said main spindle around the axis thereof,
a stationary frame formed in a rectangular frame shape and fixed to the upper face of said bed so that the horizontal sides thereof are parallel with the axis line of said main spindle and so that the vertical sides thereof are in the vertical direction,
a movable frame formed in a rectangular frame shape so that the horizontal and vertical sides thereof are parallel with the horizontal and vertical sides of said stationary frame, respectively, and provided so as to be movable in a first-axis direction along the horizontal sides of said stationary frame,
a first saddle provided so as to be movable in a second-axis direction along the vertical sides of said movable frame and having an accommodation hole passing through in a third-axis direction orthogonal to both of said first axis and said second axis,
a quill accommodated inside said accommodation hole in said first saddle and provided so as to be movable in said third-axis direction,
a first tool rest supported on the front end face of said quill,
a first guide device for guiding the movement of said movable frame along said first axis,
a second guide device for guiding the movement of said first saddle along said second axis,
a third guide device for guiding the movement of said quill along said third axis,
a first feed device for moving said movable frame in said first-axis direction,
a second feed device for moving said first saddle in said second-axis direction,
a third feed device for moving said quill in said third-axis direction, and
a control device for controlling the operations of said rotation drive device, said first feed device, said second feed device and said third feed device.

2. An NC lathe in accordance with claim 1, wherein said first feed device comprises a first driven member fixed to one of the horizontal side portions of said movable frame, a first drive member provided on one of the horizontal side portions of said stationary frame along said first axis and engaged with said first driven member to move said first driven member in said first-axis direction, a second driven member fixed to the other horizontal side portion of said movable frame, and a second drive member provided on the other horizontal side portion of said stationary frame along said first axis and engaged with said second driven member to move said second driven member in said first-axis direction.

3. An NC lathe in accordance with claim 1, wherein
said bed is formed so that the front face thereof is parallel with the vertical plane including said first axis;
said NC lathe further comprises:
a second saddle provided on the front face of said bed so as to be movable in said first-axis direction,
a second tool rest provided on said second saddle so as to be movable in said second-axis direction,
a fourth guide device for guiding the movement of said second saddle along said first axis,
a fifth guide device for guiding the movement of said second tool rest along said second axis,
a fourth feed device for moving said second saddle in said first-axis direction, and
a fifth feed device for moving said second tool rest in said second-axis direction;
said control device is further configured so as to control the operations of said fourth feed device and said fifth feed device; and
said first tool rest is configured so as to be provided above the axis line of said main spindle and so as to approach the axis line of said main spindle from above and move away therefrom upward, and said second tool rest is configured so as to be provided below the axis line of said main spindle and so as to approach the axis line of said main spindle from below and move away therefrom downward.

4. An NC lathe in accordance with claim 1, wherein
said quill has a slit hole passing through vertically, the shape of which in the longitudinal direction is formed in said third-axis direction,
said first saddle has through holes passing through vertically and aligned with said slit hole in said quill in the vertical direction, and
said second feed device comprises a driven member fixed to said first saddle, and a drive member bridged between both horizontal side portions of said movable frame in a state of being inserted into said through holes in said first saddle and said slit hole in said quill along said second axis and configured so as to be engaged with said driven member to move said driven member in said second-axis direction.

5. An NC lathe in accordance with claim 1, wherein
said third guide device comprises a sliding guide mechanism provided between the front inner circumferential faces of said accommodation hole in said first saddle and the front outer circumferential faces of said quill, and a rolling guide mechanism provided between the rear inner circumferential face of said accommodation hole in said first saddle and the rear outer circumferential face of said quill, and said quill is configured so that the movement thereof in said third-axis direction is guided by said sliding guide mechanism and said rolling guide mechanism.

6. An NC lathe in accordance with claim 1, wherein said first tool rest is provided with a main spindle supported so as to be rotatable around the axis thereof, and a drive motor for rotating said main spindle around the axis thereof is built in said first tool rest, and the electric wiring of said drive motor is connected to said drive motor via an inner space in said quill, an inner space formed in the installation portion of said quill and said first tool rest, and an inner space in said first tool rest sequentially.

* * * * *